United States Patent [19]

Bedford et al.

[11] Patent Number: 5,063,193

[45] Date of Patent: Nov. 5, 1991

[54] BASE METAL AUTOMOTIVE EXHAUST CATALYSTS WITH IMPROVED ACTIVITY AND STABILITY AND METHOD OF MAKING THE CATALYSTS

[75] Inventors: Raymond E. Bedford, Burton; William J. LaBarge, Bay City, both of Mich.

[73] Assignee: General Motors Corporation, Detroit, Mich.

[21] Appl. No.: 534,584

[22] Filed: Jun. 6, 1990

[51] Int. Cl.$^5$ .......................... B01F 17/00; B01J 23/10
[52] U.S. Cl. ..................................... 502/304; 423/263; 423/213.2
[58] Field of Search ...................... 502/304; 423/213.5, 423/263, 213.2

[56] References Cited

U.S. PATENT DOCUMENTS

| | | | |
|---|---|---|---|
| 3,226,340 | 12/1965 | Stephens et al. | 252/465 |
| 3,789,022 | 1/1974 | Schenker et al. | 252/462 |
| 3,819,535 | 6/1974 | Huba et al. | 252/462 |
| 3,993,572 | 11/1976 | Hindin et al. | 502/304 |
| 4,782,038 | 11/1988 | Gandhi et al. | 502/304 |
| 4,900,712 | 2/1990 | Bar-Ilan et al. | 502/304 |
| 4,940,685 | 7/1990 | Sauvion et al. | 502/304 X |
| 4,957,710 | 9/1990 | Nagai et al. | 502/304 X |

*Primary Examiner*—W. J. Shine
*Attorney, Agent, or Firm*—George A. Grove

[57] ABSTRACT

An improved particulate washcoat for use on a ceramic or metallic support is disclosed for the treatment of automotive exhaust gases. The mixture consists essentially of high surface area ceria particles and alumina particles wherein the ceria particles bear copper oxide. Preferably, one of chromium oxide, manganese oxide and tin oxide are dispersed over both the ceria and alumina particles of the washcoat.

9 Claims, 2 Drawing Sheets

BASE METAL AUTOMOTIVE EXHAUST CATALYSTS WITH IMPROVED ACTIVITY AND STABILITY AND METHOD OF MAKING THE CATALYSTS

This invention relates to a base metal catalyst for use in the treatment of automotive internal combustion exhaust gases to reduce the content of unburned hydrocarbons, carbon monoxide and nitrogen oxides. More specifically, this invention relates to a particularly effective and thermally stable combination of base metal(s) dispersed on a mixture of particulate carriers for washcoat application on monolith-type catalytic converters.

BACKGROUND OF THE INVENTION

For many years, automobiles have employed catalytic converters in their exhaust systems for the treatment of combustion gases of the internal combustion engine. These catalytic converters are employed to reduce the carbon monoxide, unburned hydrocarbon and nitrogen oxide content of the exhaust. In most if not all instances, noble metal catalysts have been employed. Platinum, palladium and more recently rhodium have been dispersed on beads or pellets of gamma alumina or dispersed on micron-size particles of an alumina washcoat on the surface of a suitable ceramic or metallic support body such as an extruded cordierite monolith.

Although they are in short supply, the noble metals have been employed in these automotive applications because of their durability at the high temperatures of the exhaust gas and because of their resistance to poisoning by elements such as lead and phosphorus. Many base metals have previously been evaluated and found lacking in these critical characteristics. Various non-noble metal oxides such as the oxides of copper, chromium, nickel, vanadium, iron, zirconium, cobalt, molybdenum and tungsten have shown promising initial oxidation activity with synthetic exhaust mixtures in bench tests. However, they display much lower activity in realistic engine tests that tend to degrade the catalyst.

We have found a specific combination of a base metal oxide(s) and two oxide support materials that cooperate when in the form of a washcoat composition on a support body to overcome many of the shortcomings of the prior art uses of base metal catalysts.

SUMMARY OF THE INVENTION

In accordance with a preferred practice of our invention, this and other objects and advantages are accomplished by dispersing copper oxide on high surface area ceric oxide ($CeO_2$) support particles and mixing the copper oxide impregnated ceric oxide (also referred to herein as ceria) with particles of alumina. We prefer the use of high surface area aluminas such as, e.g., transitional, chi, gamma, delta, and theta alumina, especially thermally stable aluminas which retain a preponderance of their area despite exposure to hot exhaust gases. This mixture of copper-bearing ceria and alumina can be mixed together by ball milling and comminuted to micron size for application as a washcoat on the surface of a suitable catalytic converter support that defines the flow path of the exhaust gases to be treated. Our washcoat catalytic materials may be employed on extruded ceramic monolithic honeycomb supports and on shaped metallic converter supports.

In another embodiment of our invention, chromium, tin and/or manganese may also be applied with copper on the high surface area ceria. In still another embodiment of our invention, chromium, tin and/or manganese may be applied to both the copper-bearing ceria and the alumina particles. Preferably, the chromium, tin and/or manganese is applied to the copper oxide/ceria-alumina washcoat mixture after it has been applied to the converter support body.

Suitable proportions for our washcoat material are as follows. Insofar as the carrier particles are concerned, we prefer to use, based on a total of 100 parts by weight, 20 to 70 parts ceria (especially 50 to 70 parts ceria) and the balance alumina. Further, we prefer to use a high surface area ceria prepared as we describe below. On this same basis of a total of 100 parts of ceria plus alumina carrier particles, we prefer to use 1 to 15 parts of copper, which is on the ceria particles only. As noted above, optionally chromium, tin and/or manganese may be applied to the ceria or alumina or to both the ceria and alumina. Chromium is preferably used in amounts of 1 to 10 parts and tin or manganese in amounts of 1 to 25 parts total. In general, we prefer to use only one of tin or manganese. Of course, once the copper, chromium, tin and/or manganese have been applied to these carriers and calcined as will be described below, these materials are present as their respective oxides. However, the proportions expressed above for the metals are in terms of the metals, not their oxides.

We prefer the use of a high surface area (HSA) cerium oxide prepared by calcining a cerium acetate that has been prepared from another cerium compound such as cerium carbonate.

These and other objects and advantages of our invention will be more clearly understood in view of a detailed description which follows. Reference will be had to the drawings in which:

DETAILED DESCRIPTION OF THE INVENTION

Figure 1:
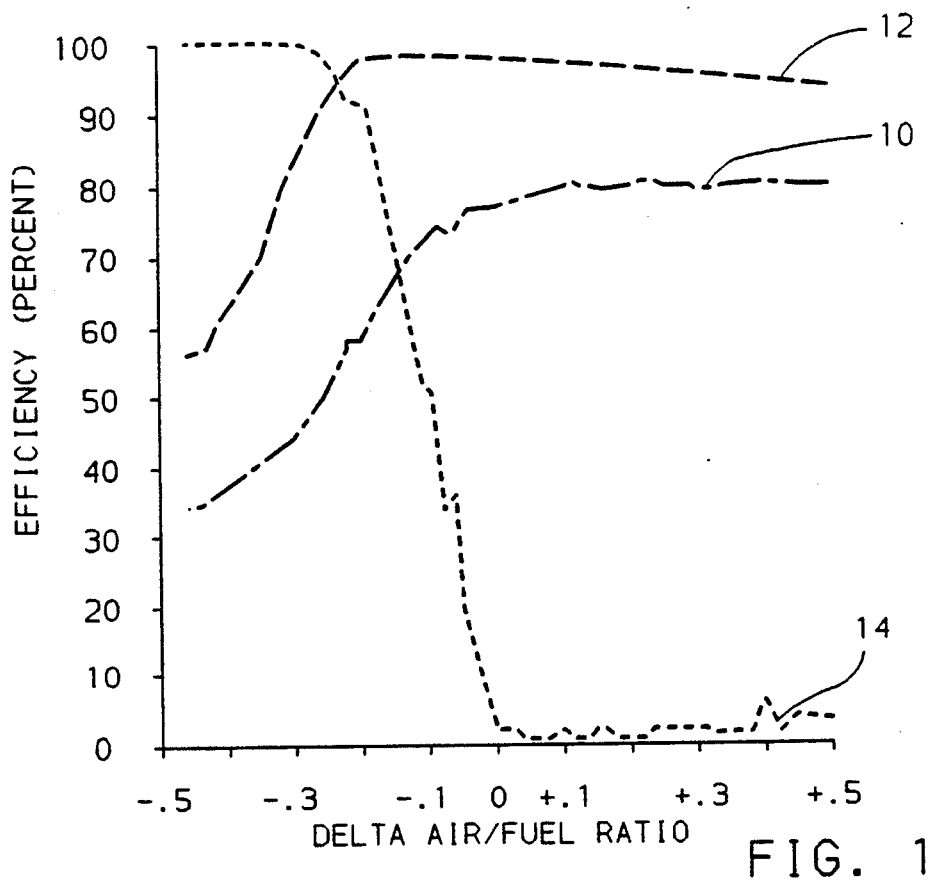
FIG. 1 is a plot of exhaust gas constituent conversion efficiency vs. air-to-fuel ratio for a fresh copper oxide on ceria with alumina catalyst of our invention.

A high surface area cerium oxide is an important component of our catalyst composition, and we have developed a novel preferred method of preparing such a cerium oxide compound so that it is relatively thermally stable and retains usable surface area despite prolonged exposure to oxygen and other exhaust constituents at elevated temperatures. We prefer to prepare the high surface area cerium oxide from a wet cerium carbonate (about 35 percent by weight water) by first heating the carbonate with acetic acid and calcining the product (presumably cerium acetate) in air to obtain a ceria with a BET surface area of approximately 80 to 100 meters$^2$/gram. Our ceria can be prepared from other cerium acetate starting material.

EXAMPLE OF THE PREPARATION OF HIGH SURFACE AREA CERIUM OXIDE

Three thousand grams of wet, solid $Ce_2(CO_3)_3$ (about 35 percent water) was reacted with 1569 grams of glacial acetic acid. This amount of acetic acid represented an excess over the stoichiometric amount required to convert the cerium carbonate to cerium acetate. Carbon dioxide was evolved. The resulting product (cerium acetate) was dried and calcined at about 425° C. for about two hours in a stream of air flowing at a rate of about 30 standard cubic feet per minute (SCFM). A thermally stable, high surface area (HSA) ceric oxide was produced.

Ceric oxides prepared by this method typically have BET surface areas in the range of 80 to 100 $m^2/g$. Preferably, a ceric oxide with a surface area in excess of 80 $m^2/g$ is obtained. We were interested in determining how the surface area of such ceric oxide was affected by heating in air at 950° C. for four hours. We view such a heating schedule as useful in assessing the performance of automotive exhaust treatment catalytic materials in resisting thermal degradation. It was found that after exposure at 950° C. in air for four hours, our calcined acetate-based ceric oxide retained a BET surface area of 12 to 16 $m^2/g$. Although considerable surface area is lost by such heating, such residual area is very useful in providing durability in our catalyst.

It is recognized that other forms of ceric oxide can be prepared by the calcination of other cerium compounds. However, these other forms have not retained as much of their surface area in our thermal aging tests. We have prepared representative ceric oxides by the following steps: (a) cerium carbonate was calcined in air at 425° C. to $CeO_2$; (b) wet cerium nitrate was calcined to $CeO_2$ at 425° C.; and (c) ceric nitrate was converted to ceric citrate and calcined to ceric oxide at 425° C.. The cerium carbonate-based ceric oxide had an initial BET surface area of 60 to 70 $m^2/g$, but upon heating at 950° C. for four hours, its effective surface area fell to about 1.5 $m^2/g$. The cerium nitrate-based ceric oxide had an initial BET surface area of 50 to 60 $m^2/g$ and its surface area diminished to 6 $m^2/g$ after the heating schedule at 950° C. The ceric citrate-based ceric oxide had an initial surface area of 60 to 70 $m^2/g$ and a post-950° C. heating regimen surface area of about 6 $m^2/g$.

This cerium acetate-based ceria has application in catalytic washcoats for automotive exhaust treatment apart from our base metal catalyst. Calcined HSA $CeO_2$ (from cerium acetate) may be wet milled with gamma alumina and the milled mixture applied as a washcoat on monolithic substrates for noble metals. For example, a mixture of about, by weight, 8 parts cerium acetate, 20 parts calcined cerium acetate (HSA ceria) and 72 parts gamma alumina can be wet milled (water plus a small amount of nitric acid) to a suitable consistency and particle size and coated as a washcoat on a ceramic or metallic substrate. After drying and calcining, the HSA ceria-gamma alumina particle washcoat can be impregnated with a suitable solution of noble metal(s) and again dried and calcined to make a very effective and durable catalyst for exhaust treatment.

However, in our base metal catalyst, we use the HSA ceria as follows.

We prefer the use of the acetate-based ceric oxide because it contributes markedly improved thermal stability to our base metal catalyst. However, other ceric oxides such as those described are suitable for use in the practice of our invention.

EXAMPLE 1

This example illustrates the preparation and evaluation of our copper oxide-coated ceric oxide mixed with alumina.

Seven hundred seventy grams of HSA $CeO_2$ particles (prepared from cerium acetate as described above) were tumbled and sprayed with a solution of 532 grams of $Cu(NO_3)_2.3H_2O$ (140 grams of copper) in 600 ml of water. This practice was executed so that the copper nitrate was uniformly mixed with and applied to the ceria. The resultant product was dried and calcined in a calcining furnace for two hours at about 425° C. and the copper nitrate converted to copper oxide.

Four hundred sixty-five grams of this $CuO-CeO_2$ powder and 592 ml of water were wet milled in a mill jar for two hours. To the mill were then added 233 grams gamma alumina, 37 grams alumina hydrate ($Al_2O_3.H_2O$) and about 10 grams nitric acid. Ball milling was continued for an additional four hours. At this point, the particle size of the mixture was in the range of 1 to 2 microns.

The resultant milled slurry was used to washcoat an extruded and calcined 85 $in^3$ cordierite monolith substrate. The slurry was poured downwardly through the longitudinal passages of the substrate and air was subsequently drawn into the passages to provide uniform coating thickness and to remove excess material. The washooated monolith was then dried and calcined at 425° C. for one hour. The total washcoat adhered on the monolith was 225 grams, and the washcoat consisted essentially of, by weight, 53.1 percent HSA $Ce_2$, 9.8 percent CuO and 37.0 percent gamma $Al_2O_3$ This composition contains about 8.7 parts copper per 100 parts ceria plus alumina. Of course, the CuO was dispersed on the $CeO_2$ and the $Al_2O_3$ was essentially uncoated. In our composition, the $Al_2O_3$ provides or improves adherence, integrity and durability to the thin washcoat coating on the cordierite monolith substrate. The base metal washcoat substrate is now ready for evaluation in an automotive exhaust gas stream.

Our coated monolith was placed inside a suitable stainless steel converter container and connected to the exhaust pipe of a 1.8 liter four cylinder engine driving a water brake dynamometer. It has been the experience of the automotive industry that the treatment of automotive exhaust gas by noble metal catalysts is more effective when the ratio of the mass of air to the mass of fuel delivered to the engine is periodically varied about its stoichiometric value (about 14.6 parts air to 1 part fuel). Such cyclic variation of the engine air-to-fuel ratio makes catalytic conversion of each of HC, CO and $NO_x$ more effective because HC and CO conversion is favored by the presence of oxygen in the exhaust resulting from lean engine operation, and the conversion of $NO_x$ is favored by an oxygen-deficient exhaust that results from engine-rich operation. As stated above, noble metal three-way catalysts perform well with such cyclic engine operation. Base metal catalysts do not respond as rapidly as platinum group metals to changes in exhaust compositions. However, we have tested our new base metal catalysts in this manner because the sweep test is a recognized catalyst evaluation test.

In this sweep test evaluation, the air-to-fuel ratio (A/F) was cycled or perturbed at a frequency of 1 Hertz from an A/F of ½ unit lean of the A/F value of interest to an A/F of ½ unit rich of such unit. The exhaust gas temperature was maintained at about 482° C. during these tests. Thus, for example, when we determined the efficiency of our converter for each of HC, CO and $NO_x$ at an average A/F ratio of 15.1, the A/F ratio of the engine was actually cycled between A/F ratios of 14.6 and 15.6 each second. The exhaust gas composition was measured instrumentally by conventional means and the values recorded. We made such measurements for our catalysts in the fresh condition for A/F ratios varying from 14.1 to 15.1, i.e., from +0.5 to −0.5 of the stoichiometric A/F ratio of 14.6. A plot of the data obtained is reproduced in FIG. 1 with an A/F ratio indicated on the X axis and the efficiency of conversion of the indicated contaminant on the Y axis.

It is seen that the converter operates most efficiently in the conversion of all of HC, CO and $NO_x$ when the engine is operated close at its stoichiometric A/F ratio of 14.6. This is common with automotive exhaust treatment catalysts, and as is seen in FIG. 1, the efficiency of our base metal system prepared in this example was 76 percent for HC (curve 10), 97 percent for CO (curve 12) and 2 percent for $NO_x$ (curve 14).

Our catalyst was then aged by actual engine operation for 200 hours with the exhaust temperature of about 480° C. After such extended engine operation, measurements of the efficiency of the catalyst were again made in exactly the same manner as described above over a range of A/F ratios from ½ an A/F ratio unit rich of stoichiometric to a value ½ unit lean of stoichiometric. The efficiency of our engine aged converters was 50 percent for HC, 58 percent for CO and 2 percent for $NO_x$ at the stoichiometric A/F ratio.

Figure 2:
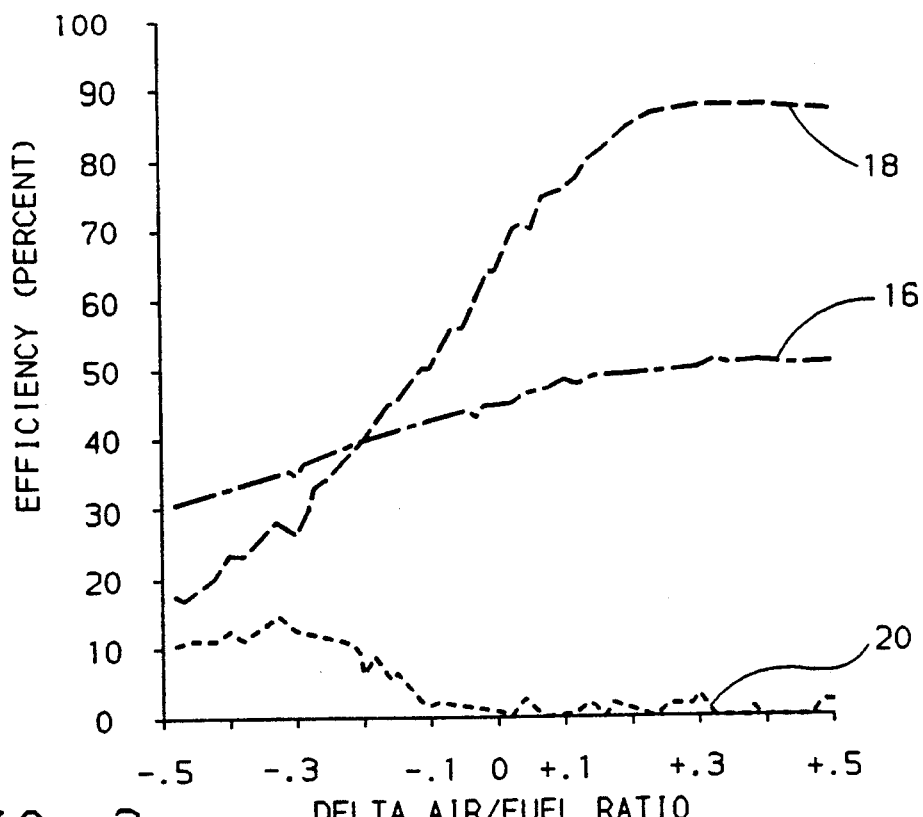
FIG. 2 is a plot like that of FIG. 1 for the catalyst of FIG. 1 after it had been aged at 950° C. for four hours.

A like copper oxide on ceric oxide and alumina particle mixture was applied to another cordierite monolith, and the monolith was tested in its fresh condition and after a thermal aging treatment that consisted of heating the monolith in air for four hours at 950° C. In this instance, the conversion efficiencies of the fresh catalyst for HC, CO and $NO_x$ were the same as those reported above while the efficiencies of the converter after this 950° C. aging process as determined in the sweep test were (see FIG. 2) 45 percent for HC (curve 16), 65 percent for CO (curve 18) and 2 percent for $NO_x$ (curve 20), respectively.

We view our CuO on ceria-alumina particulate catalytic coating material as our basic material. We have found that suitable additions of the oxide(s) of one or more of chromium, tin and manganese contribute substantially to the performance of our particulate base metal catalyst. This is illustrated in the following examples.

EXAMPLE 2

This example illustrates the preparation of a catalyst consisting of copper oxide coated high surface area ceric oxide particles with alumina particles where the ceric oxide particles also carry chromium oxide.

Three hundred eighty grams hydrated cupric nitrate $[Cu(NO_3)_3 \cdot H_2]$ (equivalent to 100 grams copper) and 385 grams hydrated chromic nitrate $[Cr(NO_3)_3 \cdot 9 H_2O]$ (50 grams of chromium) were dissolved in water to make 660 ml solution. This solution was sprayed onto 825 grams of a high surface area ceric oxide prepared in accordance with the procedure specified above. As the solution was sprayed onto the ceric oxide, the particulate oxide material was tumbled so that the solution was thoroughly mixed with it. The wet mixture was dried and then calcined at 427° C. for two hours.

A ball mill batch containing 531 grams of the Cu-Cr-$CeO_2$ powder and 813 ml of water was milled for two hours. To the mill were then added 225 grams gamma alumina, 32 grams alumina hydrate and 10 ml nitric acid. Ball milling was continued for an additional four hours. The nominal particle size of the mixture was 1 to 2 microns. The resultant milled slurry was used to washcoat an 85 cubic inch extruded cordierite monolith substrate as described in Example 1. The washcoated monolith was dried and calcined at about 425° C. for one hour. The washcoat layer weighed about 250 grams and contained by weight 56.4 percent ceric oxide, 31.8 percent gamma alumina, 6.8 percent copper oxide, and 5 percent chromium oxide ($Cr_2O_3$) A second cordierite monolith was coated with the same washcoat material in the same way.

Figure 3:
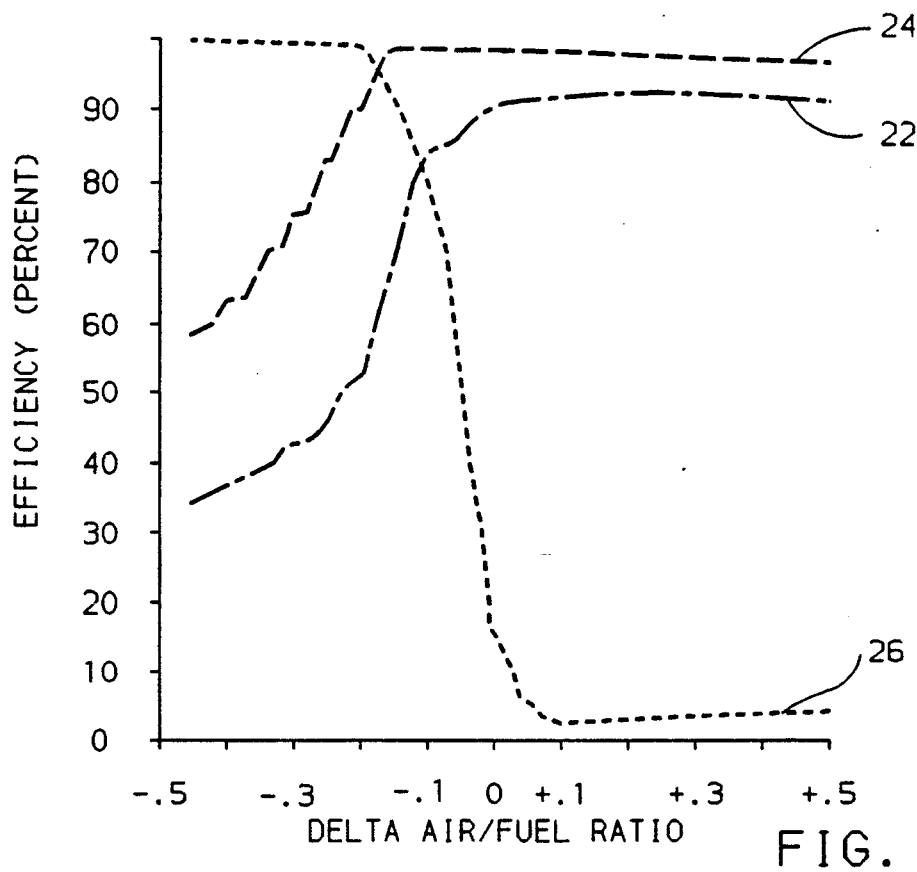
FIG. 3 is a plot like that of FIG. 1 for a fresh copper oxide and chromium oxide on ceria with alumina catalyst of our invention.

As in Example 1, a coated monolith was placed inside a stainless steel converter material and connected to the exhaust pipe of a 1.8 liter four cylinder engine driving a water brake dynamometer. Our catalyst was evaluated utilizing the sweep test over a range of air-to-fuel ratios as described fully in Example 1 above. During the test, the exhaust gas temperature was maintained at about 482° C. It was found that the efficiency of our copper oxide-chromium oxide on ceria with alumina catalyst for hydrocarbon, carbon monoxide and nitric oxides was respectively 90 percent for HC (see curve 22, FIG. 3), 98 percent for CO (curve 24, FIG. 3) and 16 percent for $NO_x$ (curve 26, FIG. 3). These efficiencies were the values obtained at an average air-fuel mass ratio of 14.6 to 1 (stoichiometric) during the sweep test in which the operating air-fuel ratio was varied from ½ unit lean of stoichiometric through stoichiometric to ½ unit rich at a frequency of 1 Hertz.

Figure 4:
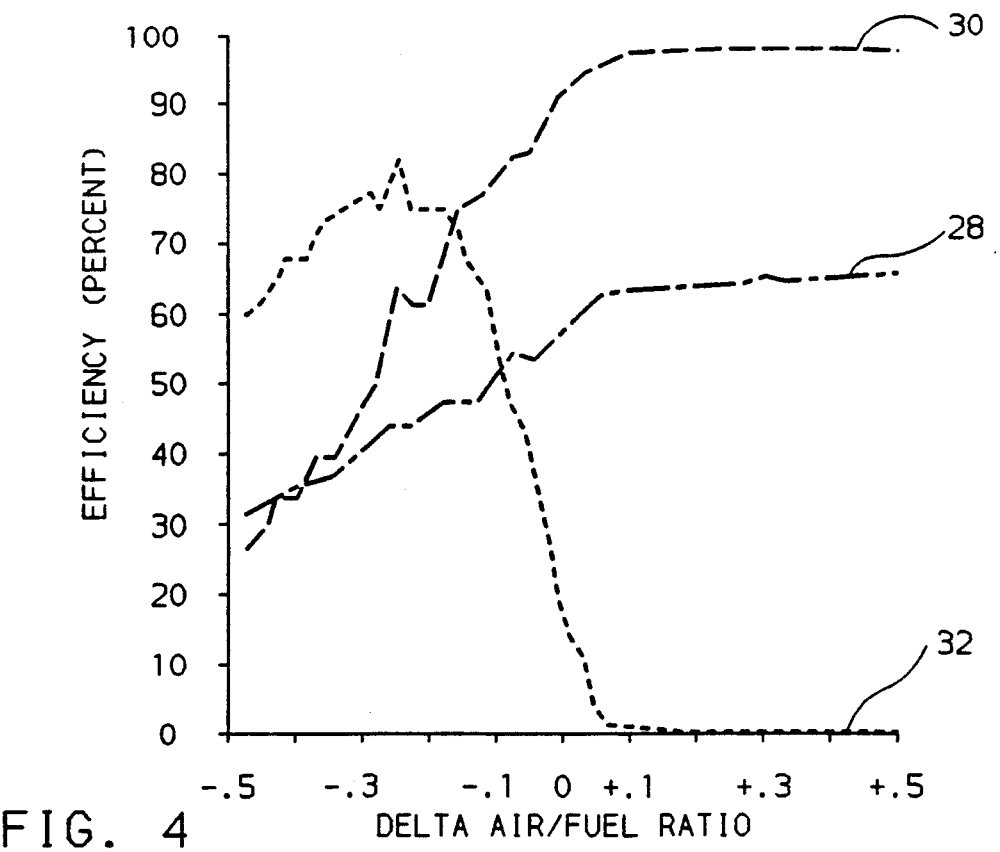
FIG. 4 is a plot like that of FIG. 3 for the catalyst of FIG. 3 after it had been aged at 950° C. for four hours.

The second monolith bearing our washcoat catalyst layer was thermally aged at 950° C. for four hours. The thermally aged monolith was then evaluated using the same practice set forth above. It was found that the efficiency of the aged catalyst at the stoichiometric fuel ratio for HC was 58 percent (curve 28, FIG. 4), for CO was 93 percent (curve 30, Figure 4) and for $NO_x$ was 16 percent (curve 32, FIG. 4).

It is seen that our base metal particulate support mixture does a very good job of retaining its conversion efficiency, especially for oxidizing exhaust gas constituents even after prolonged high temperature exposure.

In accordance with the practice of our invention, manganese oxide and/or tin oxide are also useful in combination with copper oxide. Tin and manganese may be incorporated into our catalyst through the use of suitable water soluble compounds such as stannic or stannous chloride, stannous sulfate, manganous chloride or manganous sulfate. As with the addition of chromium, we envision three suitable practices for the incorporation of these elements into our catalysts. First, the chromium or tin or manganese solution may be mixed with a solution of copper nitrate and simultaneously impregnated on the cerium oxide. The cerium oxide and the absorbed metal salts are calcined to fix the metals as their respective oxides to the cerium oxide. This calcined material is then mixed with alumina as described above and the mixture applied as a washcoat slurry to the ceramic or metallic substrate. In this practice the copper oxide and chromium oxide or tin oxide or manganese oxide are both carried only on the ceric oxide in the mixture with aluminum oxide.

In a second suitable approach, the chromium, tin or manganese compound solution can be added to the copper oxide/cerium oxide calcined material as it is being mixed with aluminum oxide particles to make a washcoat slurry. The resulting slurry is milled and the ceramic or metallic monolith coated with it to make the desired catalyst body. In this practice, the copper oxide is applied solely on the cerium oxide while the chromium oxide or manganese oxide or tin oxide is distributed over both the cerium oxide and the aluminum oxide.

In a third suitable practice, a washcoat containing copper oxide on ceria with mixed alumina particles is first formed on the support body. A solution of the chromium or manganese or tin compound is then impregnated onto the washcoat layer and calcined to form the respective oxide.

A suitable range of tin or manganese is 1 to 25 parts by weight based on a total of 100 parts of ceria plus gamma alumina. On the same basis, a suitable range of chromium is 1 to 10 parts.

In general, we prefer to add the chromium or manganese or tin to a previously formed and calcined washcoat. This means that the washcoated substrate must be calcined again after post-impregnation with the Cr, Sn or Mn. However, this practice often produces a more effective catalytic washcoat. While mixtures of chromium and/or tin and/or manganese may be applied, it is generally suitable and preferable to use just one of these three additional base metals in our catalyst mixture.

EXAMPLE 3

We have prepared and evaluated copper-manganese and copper-tin washcoat materials in accordance with the practices described above. They have been formed on both ceramic and metal monoliths and tested in converters on operating engines as described above. In the following examples, the converters were evaluated in a sweep test after thermal aging at 950° C. for four hours.

A washcoat was formed on a ceramic monolith as is described above wherein the washcoat contained by weight 4 percent copper (as copper oxide), 5 percent manganese (as manganese oxide), 55 percent ceric oxide and the balance gamma alumina. The copper oxide had been applied solely to the ceria and the manganese was distributed over both the ceria and alumina. Following the four hour thermal aging test described above, a carbon monoxide conversion efficiency of 95 percent was obtained and a hydrocarbon conversion efficiency of 55 percent was obtained. These results demonstrate the ability of our washcoat mixture to retain good carbon monoxide and hydrocarbon efficiency despite exposure to high temperature conditions.

In a like fashion, the following tin-containing washcoat material was prepared and evaluated. The washcoat composition consisted by weight of 4 percent copper, 55 percent ceria, 5 percent tin and the balance a high temperature stable gamma alumina containing about 1 to 2 mole percent lanthanum oxide. After exposure to the thermal aging test, this catalyst demonstrated a conversion efficiency for carbon monoxide of 97 percent and for hydrocarbons of 50 percent. This washcoat material had been applied to a ceramic support.

EXAMPLE 4

In the following tests, we illustrate a representative group of our catalysts as evaluated by exposure in a rapid aging test followed by testing in accordance with the well known Federal Test Procedure (FTP). Ten 85 in$^3$ cordierite monolith substrates were prepared with our base metal catalytic washcoats. Two of the monoliths were prepared with substantially identical washcoats consisting of, by weight, 4 percent copper (as copper oxide), 55 percent HSA $CeO_2$, and the balance gamma alumina. This washcoat was prepared as described in Example 1 and, of course, all of the copper oxide was dispersed as extremely fine particles on the HSA $CeO_2$. Another set of two monoliths carried a similar washcoat consisting of, by weight, 10 percent copper (as copper oxide), 55 percent HSA $CeO_2$, and the balance gamma alumina. A third set of two monoliths were prepared with substantially identical washcoats consisting essentially of, by weight, 6.6 percent Cu (as CuO), 3.3 percent Cr (as $Cr_2O_3$), 55 percent HSA $CeO_2$, and the balance gamma alumina. In this example, a washcoat of $CuO/CeO_2$ plus gamma $Al_2O_3$ particles was first formed on the substrates. The calcined washcoats were then (post) impregnated with an aqueous chromium solution and recalcined to form the final washcoats with the chromium oxide dispersed on both the alumina particles and the copper oxide-bearing ceria particles. A fourth set of two monoliths was prepared with washcoats consisting essentially of 4 percent Cu (as CuO), 5 percent Sn (as SnO), 55 percent HSA $Ce_2$, and the balance gamma alumina. A fifth set of monoliths was washcoated with 2 percent Cu (CuO), 2 percent Mn (oxide), 55 percent HSA $Ce_2$, and the balance gamma alumina. The tin and manganese oxide-containing substrates were prepared by the post impregnation of a $CuO/CeO_2$-gamma $Al_2O_3$ washcoat as was described in the preparation of the chromium oxide-containing washcoat.

One of each of the five base metal washcoated monoliths was placed in a stainless steel converter container and connected to the exhaust pipe of a 1.8 liter, four cylinder engine driving a water brake dynamometer. Each unit was first continually exposed to exhaust gases for 75 hours with the engine operating at high temperatures, high RPM and high load. This is a very severe test known as a rapid aging test (RAT). Each engine-catalytic converter unit was then operated through the FTP cycle and the overall conversion efficiencies of the converters for HC and CO measured. The data are summarized in the table below and characterized as "Normal FTP".

A second set of five base metal washcoated monoliths was placed in stainless steel converters and subjected to the same RAT-FTP tests as described in the above paragraph except that during the FTP test, each converter was moved about two feet closer to the exhaust manifold. Thus, this set of catalysts operated several hundred degrees hotter than the catalysts in the "Normal FTP" tests. The data for this second set of tests is summarized in the table and characterized as "Close Coupled FTP". It is likely that base metal automotive exhaust catalysts would be positioned closer to the engine than are present noble metal converters.

| WASHCOAT COMPOSITION | | | | | |
| --- | --- | --- | --- | --- | --- |
| | 4% Cu 55% CeO$_2$ | 10% Cu 55% CeO$_2$ | 6.6% Cu 3.3% Cr 55% CeO$_2$ | 4% Cu 5% Sn 55% CeO$_2$ | 2% Cu 2% Mn 55% CeO$_2$ |
| Normal FTP | | | | | |
| HC conversion efficiency | 38% | 30% | 31% | 44% | 30% |
| CO conversion efficiency | 41% | 20% | 18% | 54% | 22% |
| Close Coupled FTP | | | | | |
| HC conversion efficiency | 65% | 61% | 64% | 69% | 59% |
| CO conversion efficiency | 79% | 74% | 61% | 85% | 76% |

In general, we obtained higher conversion efficiencies for all of HC, CO and NO$_x$ with the tin- or manganese-containing catalysts.

In general, our washcoat materials display more conversion efficiency when carried on a metallic support as opposed to a ceramic support. However, other considerations may indicate the use of a ceramic support.

We have demonstrated various examples of the preparation, evaluation and effectiveness of catalytic washcoat mixtures. In general, we prefer that the oxide carrier portion of our washcoat material consist essentially of 20 to 70 parts (especially 50 to 70 parts) ceric oxide and 30 to 80 parts high surface area, thermally stable alumina, the total being 100 parts by weight. Based on 100 parts of ceria plus alumina, we prefer the use of 1 to 15 parts of copper on the ceria particles only and optionally 1 to 10 parts of chromium or 1 to 25 parts of tin or manganese. The chromium, tin or manganese may be used in combination but are preferably used alone. While the copper is applied only to the ceria, the chromium, tin or manganese may be applied to either the ceria or alumina or both. Obviously, once our washcoat material has been applied to a ceramic or metallic support and calcined, the copper and additional metallic element will be in the form of their respective oxides. Preferably, the maximum particle size of our washcoat is no greater than about 5 microns.

While our invention has been described in terms of certain embodiments thereof, it will be appreciated that other forms could be readily adapted by those skilled in the art. Accordingly, the scope of our invention is intended to be limited only by the following claims.

The embodiments of the invention in which an exclusive property or privilege is claimed are defined as follows:

1. A catalyst for the treatment of automobile exhaust gas comprising a support member carrying a catalytically active particulate washcoat layer, the washcoat consisting essentially of a mixture of finely divided ceric oxide carrier particles and alumina carrier particles, the cerium oxide particles having dispersed thereon copper oxide and optionally a mixture of copper oxide with one or more of chromium oxide, manganese oxide and tin oxide, and the aluminum oxide particles optionally containing one or more of said oxides other than copper oxide, wherein the proportions of ceric oxide and alumina on the basis of 100 parts by weight of total carrier particles are 20 to 70 parts ceric oxide and 30 to 80 parts alumina, the amount of copper is 1 to 15 parts per 100 parts of carrier particles, the amount of chromium is 0 to 10 parts per 100 parts of carrier particles, and the amount of tin and manganese are respectively 0 to 25 parts per 100 parts of carrier particles.

2. A catalyst for the treatment of automobile exhaust gas comprising a support member carrying a catalytically active particulate washcoat layer, the washcoat consisting essentially of a mixture of finely divided high surface area ceric oxide carrier particles made by calcination of cerium acetate and alumina carrier particles, the ceric oxide particles having dispersed thereon copper oxide and one of chromium oxide, manganese oxide or tin oxide, and the aluminum oxide particles containin9 said oxide other than copper oxide, wherein the proportions of ceric oxide and alumina on the basis of 100 parts by weight of total carrier particles are 20 to 70 parts ceric oxide and 30 to 80 parts alumina, the amount of copper is 1 to 15 parts per 100 parts of carrier particles, the amount of chromium is 0 to 10 parts per 100 parts of carrier particles, and the amount of tin or manganese is respectively 0 to 25 parts per 100 parts of carrier particles.

3. A catalyst for the treatment of automobile exhaust gas comprising a support member carrying a catalytically active particulate washcoat layer, the washcoat consisting essentially of a mixture of finely divided high surface area ceric oxide oarrier particles made by calcination of oezium acetate and alumina carrier particles, the oerium oxide particles having dispersed thereon copper oxide and chromium oxide, and the aluminum oxide particles optionally containing dispersed chromium oxide, wherein the proportions of ceric oxide and alumina on the basis of 100 parts by weight of carrier particles are 20 to 70 parts ceric oxide and 30 to 80 parts alumina, the amount of copper is 1 to 15 parts per 100 parts of carrier particles and the amount of chromium is 1 to 10 parts per 100 parts of carrier particles.

4. A catalyst for the treatment of automobile exhaust gas comprising a support member carrying a catalytically active particulate washcoat layer, the washcoat consisting essentially of a mixture of finely divided high surface area ceric oxide carrier particles made by calcination of cerium acetate and alumina carrier particles, the cerium oxide particles having dispersed thereon copper oxide and manganese oxide, and the aluminum oxide particles optionally containing dispersed manganese oxide, wherein the proportions of ceric oxide and alumina on the basis of 100 parts by weight of carrier particles are 20 to 70 parts ceric oxide and 30 to 80 parts alumina, the amount of copper is 1 to 15 parts per 100 parts of carrier particles and the amount of manganese is 1 to 25 parts per 100 parts of carrier particles.

5. A catalyst for the treatment of automobile exhaust gas comprising a support member carrying a catalytically active particulate washcoat layer, the washcoat consisting essentially of a mixture of finely divided high surface area ceric oxide carrier particles made by calcination of cerium acetate and alumina carrier particles, the cerium oxide particles having dispersed thereon copper oxide and tin oxide, and the aluminum oxide particles optionally containing dispersed tin oxide, wherein the proportions of ceric oxide and alumina on the basis of 100 parts by weight of carrier particles are 20 to 70 parts ceric oxide and 30 to 80 parts alumina, the amount of copper is 1 to 15 parts per 100 parts of carrier particles and the amount of tin is 1 to 25 parts per 100 parts of carrier particles.

6. A method of making a high surface area cerium oxide having resistance to loss of surface area at automotive exhaust gas temperatures, comprising treating a wet, solid cerium compound with an amount of acetic acid in excess of that for stoichiometric conversion of such compound to cerium acetate and calcining said acid heated cerium compound at a temperature in excess of 350° C. to form cerium oxide with a surface area of at least 80 $m^2/g$.

7. A method of making a washcoat mixture for an automotive exhaust gas catalyst comprising wet milling a mixture comprising high surface area alumina particles and particles of ceria made by the calcination of cerium acetate to obtain slurry of desired consistency and particle size, and applying the wet slurry as a uniform thin coating to a monolithic-type substrate.

8. The method of claim 7 wherein finely divided CuO particles are dispersed on the ceria particles prior to the wet milling of the ceria with alumina.

9. The method of claim 7 wherein the slurry-coated substrate is dried and calcined to form an adherent washcoat layer of a particulate mixture of ceria and alumina and the washcoat layer is subsequently impregnated with a solution of a compound of an automotive exhaust gas catalyst.

* * * * *